United States Patent [19]

Moore

[11] Patent Number: 4,567,055
[45] Date of Patent: Jan. 28, 1986

[54] EXTRUDED CONFECTIONS

[75] Inventor: Carl O. Moore, Rochester, Ill.

[73] Assignee: A. E. Staley Manufacturing Company, Decatur, Ill.

[21] Appl. No.: 587,339

[22] Filed: Mar. 6, 1984

[51] Int. Cl.[4] .......................... A23G 3/00; A23L 1/04; A23L 1/195
[52] U.S. Cl. ...................................... 426/578; 426/660
[58] Field of Search ......................... 426/578, 660, 661

[56] References Cited

U.S. PATENT DOCUMENTS 3,265,510 8/1966 Wurzburg et al. ................... 426/660
3,446,628 5/1969 Schoch et al. ....................... 426/578
3,717,475 2/1973 Germino et al. ..................... 426/578

Primary Examiner—Jeanette M. Hunter
Attorney, Agent, or Firm—James B. Guffey; Michael F. Campbell

[57] ABSTRACT

An improved method is provided for extruding a starch containing gel confection such as jelly bean centers, imitation fruit slices, and the like. The confection is prepared from a mixture of (a) a starch having a cold-water-solubility of greater than 25 percent, hydratable and functioning as a gelling colloid and (b) saccharides. The starch is heated at a temperature below the boiling point of the mixture to fully gelatinize the starch, and the mixture is extruded to provide the gel confection.

11 Claims, No Drawings

EXTRUDED CONFECTIONS

The present invention relates generally to the manufacture of confections by extrusion, and more particularly, it relates to extruded confections which include starch and which can provide transparent to translucent gels at temperatures below the boiling point of the mixed ingredients.

BACKGROUND OF THE INVENTION

It has long been known that gum confections can be made with starch and, for many years, jelly bean centers and imitation fruit pieces, sometimes referred to as sugared jellies, have been made with ingredients including starch. These confections have a firm gel structure with all of the starch gelatinized and are typically manufactured by a starch mold casting process, referred to in the trade as the Mogul system.

In accordance with this standard system, the ingredients, including a thin boiling starch, or blends of thin boiling and high amylose starch, are cooked at a moisture above the final moisture of the confection, and deposited as a thin, hot liquid into a starch mold. The starch in the mold forms the candy pieces and serves to reduce the moisture content of the confection to the level of the end product. Typically, the cooked moisture is about 20-25 percent in commercial continuous pressure cooking systems, and the final moisture is about 14-18 percent.

The use of this type of starch mold casting process has many disadvantages, particularly since the deposited candy pieces and molding starch must be dried (24-72 hrs) to reach final product moisture content. It has been recognized as desirable to provide an in-line extrusion process for these gel confections, providing cooking and forming at the desired finished moisture content. However, such a process has not been commercially successful and most of the gel confections comprising jelly bean centers and imitation fruit pieces are presently being made by the starch mold casting process.

In order to get the desired gel structure, the starch has been cooked at temperatures above the boiling point of the ingredients, i.e., above about 138° C., and with moisture present in excess of that in the end product to achieve full gelatinization and a transparent to translucent gel. It is possible to cook at lower temperatures, or with moisture starved conditions, with the result that the starch does not fully dissolve and the ungelatinized starch essentially functions as a filler, with the consequence that the confection does not have a desired body and/or texture. Thus, it has been recognized that high temperature heating, well above the boiling temperature of the mixed ingredients, is required. High temperature extrusion encounters problems with caramelization, air entrapment, and boiling and flash-off at the discharge orifice. Resultant textures range from that of hard candy to tough licorice consistency. High temperature extrusion has not been successfully practiced in providing the classic resilient gel structure, clarity, and flavor attributes of starch molded gel confections such as jelly bean centers and imitation fruit pieces.

Various processes have been proposed for the manufacture of gel confections by extrusion, but these processes have not been commercially successful in providing a firm gel with transparent to translucent appearance for jelly bean centers, imitation fruit pieces, and the like. These confections as indicated are, therefore, presently commercially manufactured by the starch mold casting process.

U.S. Pat. No. 3,265,508 to Wurzburg et al issued Aug. 9, 1966 discloses the manufacture of confections by extrusion of a confectionary product including an acid converted starch having a high fluidity, i.e., a fluidity above 20. By having such high fluidity, the starch does not provide a confection having the firm gel structure, when cooked below boiling temperature, necessary for jelly bean centers, imitation fruit pieces, and the like. Furthermore, at temperatures below the boiling point of the mixed ingredients, converted starches do not fully gelatinize to provide transparent to translucent gels. In short, these converted starches are not effective in providing the gel structures necessary for jelly bean centers, imitation fruit pieces and the like in an extrusion process. When the lower temperatures disclosed in the patent are used, the converted starch essentially functions as a filler and does not provide the desired gel.

U.S. Pat. No. 3,265,509 to Wurzburg et al issued Aug. 9, 1966 is also directed to the manufacture of confections by extrusion, utilizing starches which contain at least 50 percent amylose. These high amylose starches require high temperatures to gelatinize the starches and specifically, they need temperatures above the boiling temperatures of the mixed ingredients to achieve the clear firm gels desired. At lower temperatures, the high amylose starches are not adequately gelatinized and largely function as fillers in the confections.

U.S. Pat. No. 3,265,510 to Wurzburg et al issued Aug. 9, 1966 also discloses the manufacture of confections by extrusion from essentially native starch. Such starch has a fluidity of less than 20 but requires temperatures in the range of 160° C. to 188° C., which are well above the boiling temperature of the mixed ingredients for the confections, to achieve gelatinization and provide firm transparent to translucent gel confections. Accordingly, the use of these native starches to provide the desired gel structures for jelly bean centers, imitation fruit pieces, and the like, do not result in successful extrusion commercially at the end moisture contents of the gel confections and give transparent to translucent gels having a firm gel structure.

It is desirable to avoid the molded starch method and to provide jelly bean centers, imitation fruit pieces, and the like, by an extrusion process. Successful extrusion of these confections is highly advantageous to the confection industry. The production speed for manufacture of confections can be increased greatly if an acceptable extrusion process was available. Confections made by this invention can be made in 30 minutes to 24 hours as compared to 24 to 48 hours for the traditional processes. Additionally, there are fewer mechanical problems, such as jammed molds, with an extrusion process.

Accordingly, it is a principal object of this invention to provide extruded gel confections which include starch and which provide transparent to translucent gels and which develop a firm gel structure when processed at temperatures below the boiling point of the mixed ingredients. It is a more particular object of the invention to provide an improved method for extruding gel confections, including starch, to provide firm gels at temperatures below the boiling point of the mixed ingredients. A still further object of the invention is the provision of an improved extrusion process for the manufacture of jelly bean centers, imitation fruit pieces, and the like, by an extrusion method.

Throughout the specification and claims, percentages and ratios are by weight, temperatures are degrees Celsius, and pressures are in atmospheres over ambient unless otherwise indicated. To the extent that any of the foregoing references are applicable to the present invention, they are herein incorporated by reference.

SUMMARY OF THE INVENTION

These and other objects are accomplished by a process for the manufacture of starch containing gel confections by extrusion comprising the steps of mixing:

(a) a starch having a cold-water-solubility of greater than 25 percent, the starch being hydratable to function as a gelling colloid; and (b) sweetener components including crystalline and liquid corn and sugar materials; and (c) heating the mixture at a temperature above the gelatinization point of the starch, but below the boiling point of the mixture to fully gelatinize the starch; and (d) extruding the mixture as a firm, transparent to translucent gel.

DETAILED DISCLOSURE OF THE INVENTION

The present invention comtemplates the manufacture of gel confections comprising fully gelatinized starch and sugars by extrusion to provide a product wherein the gel is transparent to translucent and has a firm structure, but such confections do not include hard candy; neither do they include gels with flowable characteristics. The end confection products are of three basic types which vary primarily in gel texture and coating procedure.

The gel confection may be moistened with steam and rolled in granulated sugar to produce the classic gumdrop, orange slice, or similar pieces ("sugared jellies"). The gels in these confections are firm and have ample resiliency for shape retention when marketed in stacked bags or in bulk. However, the eating qualities of the gel are desirably a soft tender bite and moderately quick dissolving when chewed. A second type of gel confection is jujubes or hard gums produced from the same primary gel ingredients as sugared jellies, but dried to a lower moisture content and generally containing additional starch. The surface is coated with an edible oil, rather than granulated sugar. By intent, the finished confection is much firmer in gel strength, characteristically tougher to bite, and longer lasting when chewed, than sugared jellies. A third type of gel confection is jelly beans having starch jelly centers which are resilient and firm enough for tumbling in a revolving pan for coating with a sugar shell.

All of these confections have in common, firm, resilient gel structure and optically transparent to translucent appearance.

Since the gel confections of the invention will be extruded, the ingredients making up the confections will be mixed together in the proportions which occur in the resulting confection and at the moisture level equivalent to that resulting after starch molding. The mixed ingredients should be fluid so as to be readily introduced into extrusion equipment and avoid air incorporation. The ingredients will include a particular starch, to be hereinafter described, at a level of between about 6 percent and about 16 percent, on a dry basis, and preferably between 10 and 15 percent; sweeteners, usually in the form of high solids syrups, and desirably some coarse corn syrup solids, the sweeteners being present at a level of between about 84 percent and about 94 percent, on a dry basis; and edible oil at a level of between about zero percent and about 5 percent to adjust the gel strength and to function as a lubricant for the product. Moisture from the various ingredients, including added water, will be present in the mixture at a level of less than 25 percent and should be present at a level greater than 10 percent. Color, artificial flavor, natural fruit purees, juice concentrates, acidulants, and other optional ingredients can be added as desired to provide a desired confection.

The ingredients are mixed together in a mixing kettle and poured into an extruder, which extrudes a transparent to translucent gel in the form of a rope that may be fed onto sugared trays or onto polyfilm sheets, or that may be cut immediately at the die face. The gel confections can be cut with oil or water lubricated scissors or a knife, either immediately upon extrusion or after some cooling. The extruder may comprise various zones which can be at varying temperatures but, in the extruder, the temperature of the mixture (40°–120° C.) is kept below the boiling point of the mixed ingredients so that extrusion can be achieved without affecting the gel structure or flavor, and without moisture flash-off. The maintenance of the extruder below the boiling point of the mixed ingredients is a particular feature of the invention, while providing full gelatinization and dispersion of the starch in the confection, and a gel which is transparent to translucent.

The provision of a transparent to translucent gel with a firm structure and with the starch fully gelatinized at temperatures below the boiling point of the mixture is new to the extruded-confection art and avoids the need of the molded starch process, and particularly the Mogul system.

The particular starch used is a significant feature of the invention. The starch should have a cold-water-solubility of greater than 25 percent, and hydrate to be functional as a gelling colloid. The starch may derive from native starches and may be pregelatinized. The starch should fully gelatinize or hydrate in a concentrated sweetener syrup at or below its atmospheric boiling point. At cold-water-solubilities of less than 25 percent, gel confections do not result with adequate gel strengths.

A particular starch which is useful in the practice of this invention can be prepared in either a batch type process of as a continuous process. In either instance, the first step in carrying out the process is the preparation of a slurry comprised of about 10 to 25 parts by weight dry substance basis (dsb) of an ungelatinized corn starch in a liquid medium comprised of about 50 to about 75 parts by weight of an alcohol selected from ethanol, propanol and isopropanol and about 13 to about 30 parts by weight of water, provided that the liquid medium for the slurry contains about 15 to about 35% by weight of water inclusive of the water in the starch. Preferably the slurry is comprised of about 12 to about 20% by weight of starch (dsb) and about 17 to about 30% water.

The slurry of an ungelatinized corn starch in an aqueous alcohol medium is heated to a temperature of about 148° to about 184° C. under autogenic pressure for about 1 to about 30 minutes. The heating process can be conducted as a batch process in a sealed vessel or as a continuous or semi-continuous process by passing the slurry through a heated confined zone at a rate calculated to give a residence time for the slurry in the heated zone of about 1 to about 30 minutes. Preferably the starch slurry is heated to a temperature of about 158° to about 176° C. for a period of about 1 to about 10 minutes to convert the ungelatinized corn starch to the cold-water-swelling starch having high cold-water-solubility. The cold-water-solubility is above 25%, preferably above 50% and most preferably greater than 70%.

In one embodiment of the process the ungelatinized corn starch slurry contains about 12 to about 20% by weight of starch (dsb) and the liquid medium for the slurry contains 18 to about 26% by weight of water; conversion of the ungelatinized corn starch to the cold-water-swelling/soluble starch is accomplished by heating the slurry to a temperature of about 162° to about 171° C. for a period of 1 to about 5 minutes.

After the heating step, the slurry is preferably cooled to below about 50° C., and the product cold-water-swelling granular starch is separated from the liquid medium component of the slurry by filtration or centrifugation. Following the recovery of the starch product from the reaction slurry, the starch is typically washed with 1 or more volumes of the alcohol used in the process, and dried and/or desolventized by conventional methods. For example, the starch can be dried in an oven to a certain volatiles level and then contacted with a hot humid gas, preferably moist air or steam, while the starch is maintained at a temperature from about 60° to about 121° C. for a time sufficient to reduce the alcohol content of the starch to a food acceptable level.

The sweeteners used in the manufacture of the confections are those usually employed in the preparation of jelly bean centers, imitation fruit pieces, and the like, and include sucrose, fructose, high-solids dextrose, high fructose corn syrups and corn syrups, in general, these sweeteners include all commonly used mono- and disaccharides. In order to facilitate mixing and desired gel formation, it has been found desirable to add coarse corn syrup solids having a sieve size of between about 8 mesh and about 40 mesh. These solids may be used to adjust the moisture level as well.

The order of addition of the ingredients for mixing together is largely a matter of convenience. Ideally, water, if necessary, is first mixed into the syrup, then the starch is added. If the syrup has excess moisture, dry coarse corn syrup solids may be added to the syrup, but dry coarse corn syrup solids merely disperse in the syrup and do not dissolve, thereby avoiding significant increase in viscosity after addition. Hydration of starch and thickening of the uncooked slurry mixture is to be avoided. The color and flavoring, and/or other additives can be added as desired to the mixture. After mixing, a flowable product results and the mixture is fed into the extruder. It is not necessary to use a pump or ram. The extruder may be any of several devices which are capable of subjecting the mixture to uniform mixing and sufficient heat for purposes of gelatinizing the starch. The extruder will provide some shearing action while forcing the mixture through the extruder and out of an orifice. The orifice may be sized and shaped to provide a desired form to the gel confection. As pointed out, the extruder may comprise several sections to effect heating and cooling in the barrel of the extruder, or an arrangement may be provided so that one extruder functions to heat the mixture and another extruder serves to cool the mixture before final extrusion. The selection and/or arrangement of extruders is within the skill of the art.

Since the temperature used for effecting the gelatinization of the starch is below the boiling point of the mixture, there is little danger of affecting the taste and color characteristics of the finished confection. Since lower temperatures are used in the process, high pressures are not needed to be used. In generally, the product will continuously extrude in the form of a rope and can be suitably cut to desired shapes. The extruded gel confection can be further processed to provide various forms of gel confection, as before indicated.

The following examples further illustrate embodiments of the present invention.

EXAMPLE 1

Jelly bean centers were manufactured by extrusion. 342 parts of cane sugar was mixed with (a) 283 parts of a 45 D.E. high-maltose corn syrup, sold under the tradename NETO ®7300, the corn syrup having a soluble solids content of about 80 percent and (b) 400 parts of a high fructose corn syrup (ISOSWEET ®5500) having a fructose content of 55 percent and a solids content of about 76 percent. 180 parts of a granular corn starch having a moisture of about 5 percent was included along with 70 pounds of water. The mixture was slurried in a mixing tank.

The granular corn starch had a cold-water-solubility of 70 percent, was chemically unmodified, and was non-birefringent. It was ungelatinized and had a fluidity of less than 20. The amylose content of the starch was 28 percent and the starch would fully gelatinize at a temperature of below about 121° C. in the corn syrup mixture.

After completely mixing, the mixture was poured into a Bonnet Model 214 Extruder, and was heated and cooled in various zones in the barrel of the extruder. The extruder had four zones and, in the first zone, the steam jacket temperature was maintained at 37° C.–46° C.; in the second and third zones at 121° C.; and in the fourth zone 77° C. The mixture was introduced at about 24° C. and discharged from the extruder at about 85° C. The product came out in the form of rope into trays and was cut with moistened scissors. The jelly bean centers had a moisture of about 17 percent. The centers were sanded with sugar in accordance with the usual practice.

The starch was fully gelatinized and provided a transparent to translucent gel. The body and texture of the resulting jelly bean centers were equivalent to commercially produced jelly bean centers by means of a Mogul system.

EXAMPLE 2

Jelly slices were prepared by blending the starch of the prior Example at a level of 2,640 grams with 5,920 grams of a high-fructose corn syrup, having a solids of about 76 percent and sold under the trademark ISOSWEET ®5500; and 15,000 grams of 42 D.E. regular corn syrup, having a solids of about 80 percent; 500 grams of hydrogenated oil, sold under the trademark PARAMOUNT ®C, was included in the mixture and yellow coloring and lemon flavor were added in minor amounts. The mixture was poured into a Bonnet Model 214 extruder having four zones in its barrel. In the first zone, the mixture was heated at about 43° C. and, in the second and third zones, at 121° C. The final zone was at about 77° C. and thus cooled the product. The mixture was introduced at 21°–26° C. and discharged at 82°–88° C. Again, the product exited in a rope form. The starch was fully gelatinized and was transparent to translucent.

The jelly slices had the character of jujubes prepared in the Mogul system.

EXAMPLE 3

Sugared jelly bean centers were prepared with the starch of Example 1. A mixture was prepared comprising 13 parts of the starch, 70 parts of the 42 percent fructose corn syrup at 80 percent solids, and 17 parts of 42 D.E. extra coarse corn syrup solids having an average mesh size of 8–40. The mixture, which has excellent flow characteristics, was poured into a Bonnot Model 214 extruder having four zones in its barrel. The temperatures in the respective zones were as follows:

|        |            |
|--------|------------|
| Zone 1 | 49° C.     |
| Zone 2 | 121–127° C.|
| Zone 3 | 107° C.    |
| Zone 4 | 71° C.     |

The product was extruded through a round 0.95 mm orifice and was transparent. The product was cut and dropped into a rotating drum of granulated sugar.

The high fructose corn syrup facilitates mixing of the dry ingredients and flowability of the mixture at ambient temperatures, as well as in the extruder. The extra coarse corn syrup solids are substantially undissolved and remain in suspension with the uncooked starch so that these corn syrup solids do not significantly contribute to the viscosity of the mixture. In fact, the mixture will deaerate during mixing. When high levels of high-solids dextrose corn syrups are used, and without the coarse solids, the mixtures for extrusion at low moisture levels become too thick and entrap excessive quantities of air, resulting in less clear gel confections. Thus, best results are achieved using high fructose corn syrups and coarse corn syrup solids to allow extrusion of gelled products in the lower end of the desired moisture range (i.e. 15% or less total moisture).

EXAMPLE 4

A sugared jelly confection was prepared with the starch described in Example 1. First, 1021 grams of water was mixed into 26445 grams of 64 D.E. corn syrup having 82 percent solids. Then 6242 grams of the starch and 11690 grams of granulated sugar. The mixture was poured into a Model 214 Bonnet extruder and operated at the following zone temperatures:

|        |        |
|--------|--------|
| Zone 1 | 55° C. |
| Zone 2 | 127° C.|
| Zone 3 | 110° C.|
| Zone 4 | 77° C. |

The product extruded as a transparent gel through a 0.95 mm orifice and onto a bed of granulated sugar and subsequently cut into individual pieces.

EXAMPLE 5

In accordance with this Example, various starches were employed having different cold-water-solubilities at a level of 3,150 grams. The starches had moisture content of about 5 percent. The starches were mixed into 15,000 grams of a high-fructose corn syrup sold under the trademark, ISOSWEET ®180, and having 80 percent solids. Extra coarse corn syrup solids were added in an amount of 3,750 grams and had a moisture content of 3 percent, the extra coarse corn syrup solids being sold under the trademark, STAR DRI ®42 X.

The ingredients were blended as in Example 3 and introduced into an extruder for cooking and extrusion. It was found that, in using a starch having a water-solubility of 92, the gel confection extruded when using a saturated steam at 2.49 kg/sq cm in the barrel of the extruder. It was experienced that at lower pressure, specifically 1.76 kg/sq cm, a cloudy product resulted. It was also found that using a higher temperature corresponding to a pressure of 3.52 kg/sq cm in the barrel jacket of the extruder, there was loss of gel strength. Accordingly, it is necessary to make adjustment of the temperature of the extruder, below the boiling point of the ingredients of the mixture, to achieve the desired clarity and gel strength for the gel confection. This is within the skill of the art.

Using a starch having a cold-water-solubility of 56, it was found that a clear gel was obtained using a steam pressure of 2.49 kg/sq cm in the barrel of the extruder.

Using a starch having a cold-water-solubility of 27, provided a clear gel out of the extruder, when using steam pressures of 2.49 kg/sq cm and 3.15 kg/sq cm, resulted in a weak gel which was marginal. Likewise, using a starch having a cold-water-solubility of less than 1, regardless of temperature, did not provide an adequate gel confection. In fact, no gel occurred. This was true even though very high temperatures were employed.

COLD-WATER-SOLUBILITY DETERMINATION

The determination of the cold-water-solubility of the starch samples was carried out by a specific procedure involving mixing a starch sample with water in a Waring Blender; centrifuging the mixture, evaporating an aliquot of the supernatant liquid and weighing the residue as solubles. The equipment utilized in measuring cold-water-solubility is as follows:

(1) Waring Blender (Model PB4) equipped with semi-micro monel metal cup (Fisher Scientific Catalog No. 14-14 509-17);

(2) International Centrifuge Model K or similar;

(3) Centrifuge tubes, 100 ml., and evaporating dish; and (4) Balance

The cold-water-solubility determination is carried out according to the following procedure:

1. Measure exactly 100 ml of distilled water at ambient temperature into the Waring Blender cup.

2. Turn the blender on slow speed (about 6100 rpm) and add 1.000 gram of starch sample over less than a 15 second period, then stir for 2 minutes on high speed (about 13,500 rpm).

3. Fill a 100 ml centrifuge tube with the starch solution/suspension and centrifuge at maximum speed (3100 rpm is satisfactory) for 15 minutes.

4. Transfer a 25 ml aliquot of the supernatant to a tared evaporating dish and evaporate on a steam bath to apparent dryness.

5. Dry in an oven at $110\frac{1}{4}$° C. for at least one hour (overnight is satisfactory) and weigh.

Cold-water-solubility, expressed as percent water solubles (dsb), is then calculated according to the following formula:

% water solubles (*dsb*) =

$$\frac{\text{(wt. of solids in 25 ml} \times 4)}{\text{(wt. of sample)} \times \frac{(100\% \text{ moisture})}{100}} \times 100$$

The invention thus provides an extruded confection having the characteristics of a product made in the starch mold casting system with the gel having the body and texture of that provided heretofore and having a transparent to translucent appearance. The product can be fed by gravity flow rather than by the need of a ram or pressure feeding into the extruder. Air incorporation is reduced by the fluid gravity feeding, and the semi-moist or pelletized feed material of prior art is avoided. Because lower processing temperatures are required, there are energy savings and improvement in the finished quality of the product. Savings can be provided over the use of the prior art starch mold casting process and equivalent jelly bean centers, imitation fruit pieces, and the like, are provided in a unique and novel manner. The various features of the invention which are believed to be new are set forth in the following claims.

What is claimed is:

1. A process for the manufacture of starch containing gel confections by extrusion comprising the steps of:
   (a) mixing a nonbirefringent starch having a cold-water-solubility of greater than 25 percent, the starch being hydratable to function as a gelling colloid; and sweetener components including crystalline and liquid corn and sugar materials; and
   (b) heating the mixture (a) and (b) at a temperature above the gelatinization point of the starch, but below the boiling point of the mixture to fully gelatinize the starch wherein said mixture has a moisture content between about 10 percent and about 25 percent; and
   (c) extruding the mixture as a firm, transparent to translucent gel.

2. A process in accordance with claim 1 wherein the sweetener in the mixture comprises high solids corn syrup.

3. A process in accordance with claim 1 wherein the sweetener in the mixture comprises fructose.

4. A process in accordance with claim 1 wherein the sweetener in the mixture includes coarse corn syrup solids having a mesh size between 8 and 40.

5. A process in accordance with claim 1 wherein the starch has a cold-water-solubility of greater than 50%.

6. A process in accordance with claim 1 wherein the sweetener in the mixture comprises high solids fructose corn syrup and coarse corn syrup solids having a mesh size between 8 and 40.

7. A process in accordance with claim 1 wherein sufficient moisture is present to provide a flowable mixture.

8. A process in accordance with claim 1 wherein the starch in the mixture is at a level between 6 percent and 16 percent (dsb) of the mixture and the sweetener is at a level between 84 percent and 94 percent (dsb) of the mixture.

9. A process in accordance with claim 1 wherein the starch (a) is gelatinized at a temperature below 121° C.

10. A process in accordance with claim 1 wherein the mixture further includes an edible oil.

11. The extruded confection of claim 1.

* * * * *

UNITED STATES PATENT AND TRADEMARK OFFICE
CERTIFICATE OF CORRECTION

PATENT NO. : 4,567,055
DATED : January 28, 1986
INVENTOR(S) : Carl O. Moore

It is certified that error appears in the above—identified patent and that said Letters Patent are hereby corrected as shown below:

Col. 9, line 31, change "mixture (a) and (b)" to --resultant mixture--.

Signed and Sealed this

Fourth Day of November, 1986

[SEAL]

Attest:

DONALD J. QUIGG

Attesting Officer

Commissioner of Patents and Trademarks